(12) United States Patent  (10) Patent No.: US 7,519,957 B2
Keidar-Barner et al.  (45) Date of Patent: Apr. 14, 2009

(54) SYMBOLIC MODEL CHECKING OF SOFTWARE

(75) Inventors: Sharon Keidar-Barner, Yokne'am Ilit (IL); Ishai Rabinovitz, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 1022 days.

(21) Appl. No.: 10/925,022

(22) Filed: Aug. 24, 2004

(65) Prior Publication Data

US 2005/0223353 A1    Oct. 6, 2005

(30) Foreign Application Priority Data

Apr. 3, 2004    (GB)    ................. 0407657.6

(51) Int. Cl.
*G06F 9/44*    (2006.01)
*G06F 9/45*    (2006.01)

(52) U.S. Cl. .............. 717/127; 717/106; 717/115; 717/124; 717/141; 717/154

(58) Field of Classification Search ............ None
See application file for complete search history.

(56) References Cited

U.S. PATENT DOCUMENTS 6,728,665 B1 *    4/2004    Gupta et al. .............. 703/2
2006/0058989 A1    3/2006    Keidar-Barner et al.

OTHER PUBLICATIONS

A. Biere et al. "Symbolic Model Checking using Sat procedure instead of BDDs", (c) 1999.*

Cimatti et al., "NuSMV: a new symbolic model checker". *International Journal on Software Tools for Technology Transfer*, 2000.

C. Eisner, "Using Symbolic CTL Model Checking to Verify the Railway Stations of Hoorn-Kersenboogerd and Heerhugowaard", *Software Tools for Technology Transfer*, vol. 4, No. 1, 2002, pp. 107-124.

T. Ball and S.K. Rajamani. "BeBop: A symbolic model checker for Boolean programs", in Spin, pp. 113-130, 2000.

I. Beer, S. Ben-David, C. Eisner and A. Landver, RuleBase: an industry-oriented formal verification tool:, in *Proc. 33$^{rd}$ Design Automation Conference (DAC)*, pp. 655-660. Association for Computing Machinery, Inc. Jun. 1996.

G. Cabodi, P. Camurati, L. Lavagno and S. Quer, "Disjunctive partitioning and partial iterative squaring: an effective approach for symbolic traversal of large circuits", in *Proceedings of the 34$^{th}$ annual conference on Design automation conference*, pp. 728-833. ACM Press, 1997.

G. Cabodi, P. Camurati, L. Lavagno and S. Quer, "Auxiliary variables for extending symbolic traversal techniques to data paths", in *Proceedings of the 31$^{st}$ annual conference on Design automation conference*, pp. 289-293. ACM Press, 1994.

(Continued)

*Primary Examiner*—Chuck O Kendall

(57) ABSTRACT

A method includes generating a model of a software program in which, at each cycle of the model, a program counter and at most one non-program-counter variable change value. The method also includes generating at least one disjunctive partition and/or at least one partial disjunctive partition for each variable of the model. The method also includes computing an image and/or a pre-image using partial disjunctive partitions. A model checker includes a modeler to generate a model of a software program in which, at each cycle of the model, a program counter and at most one non-program-counter variable change value.

18 Claims, 10 Drawing Sheets

OTHER PUBLICATIONS

W. Chan, R. Anderson, P. Beame and D. Notkin, "Improving efficiency of symbolic model checking for state-based system requirements", in *Proceedings of the 1998 International Symposium on Software Testing and Analysis (ISSTA)*. ACM Press, Mar. 1998.

D. Geist and I. Beer, "Efficient Model Checking By Automated Ordering Of Transition Relation Partitions", in *Proc. 6th International Conference on Computer Aided Verification (CAV)*, LNCS 818, pp. 299-310. Springer-Verlag, 1994.

K. Ravi, K. McMillan, T. Shiple, and F. Somenzi, "Approximation and Decomposition of Binary Decision Diagrams," in *Proc. Design Automation Conf., 1998*, pp. 445-450.

J.R. Burch, E.M. Clarke and D.E. Long, "Symbolic model checking with partitioned transition relations", in A. Halaas and P.B. Denyer, editors, *International Conference on Very Large Scale Integration*, pp. 49-58, Edinburgh, Scotland, 1991. North-Holland (HUH?).

M. Solé and E. Pastor, "Traversal techniques for concurrent systems", in *Fourth International Conference on Formal Methods in Computer-Aided Design (FMCAD)*, LNCS 2517, pp. 220-237. Springer-Verlag, 2002.

G. Holzmann, "On the fly, ltl model checking with spin: Simple spin manual", in http://cm.bell-labs.com/cm/cs/what/spin/Man/Manual.html. Updated Jun. 3, 2007.

* cited by examiner (a1 iff a2) and (b1 iff b2)

```
1:      z=0;
2:      while(x>0){
3:          z+=y;
4:          x--;
5:      }
```

```
#define  main_r1 0
#define  main_r2 x
#define  main_r3 x
#define  main_r4 5
#define  main_r5 main_r3 + main_r4
#define  main_r6 x
define  main_r7 main r_6 − 1 pc=19⇒(z←main_r1∧pc←22)
pc=22⇒(pc←16)
pc=26⇒pc←if((main_r2>0)
             then 29 else 27)
pc=27⇒(pc←53)
pc=29⇒(pc←41)
pc=41⇒(z←main_r5∧pc←48)
pc=48⇒(x←main_r7∧pc←50)
pc=50⇒(pc←22)
```

FIG.5A

```
#define main_r1 0
#define main_r2 x
#define main_r3 x
#define main_r4 5
#define main_r5 main_r3 + main_r4
#define main_r6 x
define main_r7 main r_6 - 1 next(pc)←case
    pc=19 : 22
    pc=22 : 26
    pc=26 : if(main_r2>0)
                then 29 else 27
    pc=27 : 53
    pc=29 : 41
    pc=41 : 48
    pc=48 : 50
    pc=50 : 22
    else : pc
esac:
next(x)←case
    pc=48 : main_r7
    else : x
esac;
next(z)←case
    pc=19 : main_r1
    pc=41 : main_r5
    else : z
esac;
```

FIG.5B $$r\_index_{ar} = i$$
$$r\_array_{ar} = ar[r\_index_{ar}]$$
$$x = r\_array_{ar}$$

FIG.6A $$l\_index_{ar} = i$$
$$l\_array_{ar} = x$$
$$ar[l\_index_{ar}] = l\_array_{ar}$$

FIG.6B $$r\_index_a = 1$$
$$r\_array_a = a[r\_index_a]$$
$$l\_index_a = r\_array_a$$
$$l\_array_a = 5$$
$$a[l\_index_a] = l\_array_a$$

FIG.6C if pc==28 then
  if x > 2 then
    pc' = 25
    x' = x'
    y' = y'
  else
    pc' = 29;
    x' = x'
    y' = y' if pc=22 then
  x' = x+1;
  pc' = 23;
  y' = y;
else if pc=25:
  x' = 4;
  pc' = 26;
  y'=y if pc=22 then
  pc' = 23;
else if pc=25:
  pc' = 26;
  ........

if pc=22 then
  x' = x+1;
else if pc=25:
  x' = 4;
else x'=x;

SYMBOLIC MODEL CHECKING OF SOFTWARE

FIELD OF THE INVENTION

The present invention relates to symbolic model checking generally and to symbolic model checking for software in particular.

BACKGROUND OF THE INVENTION

Modern design of very large-scale integrated circuits and of complex software systems often involves years of research and the efforts of hundreds of engineers. Automated formal verification methods may be an essential part of the design effort, reducing errors, lost time and risk to financial investment. Formal verification involves building a finite model of a system as a group of states and state transitions and checking that a desired property holds in the model. An exhaustive search of all possible states of the model may be performed in order to verify a desired property.

As the size and complexity of designs increase, much effort may be expended to improve the efficiency of automated formal verification methods. One technique used in symbolic model checking to improve efficiency is to employ binary decision diagrams (BDDs). A BDD is a directed acyclic graph that represents a Boolean expression. FIG. 1, to which reference may be now briefly made, shows an exemplary BDD for the expression ((a1 iff a2) and (b1 iff b2), where "iff" stands for "if and only if". Each circle indicates a variable (a1, a2, b1, b2) and the lines indicate the directions to follow when the variable has a value of 0 (dashed lines) or 1 (solid lines). For each BDD, there may be two terminal nodes 8 representing the result of the Boolean expression.

Boolean operations performed on a BDD are a polynomial function of the size of the BDD. While BDDs are generally a compact representation of a Boolean expression, they can be exponential in the size of the expression they are representing. In addition, the size of the BDD is significantly affected by the order in which the variables of the expression are listed.

One method for symbolic model checking using BDDs comes from Carnegie Mellon University and is known as the Symbolic Model Verifier (SMV). A good discussion of symbolic model checking may be found in the introduction to the online paper "NuSMV: a new symbolic model checker" by A. Cimatti et al., which can be found in 2003 at the website: nusmv.irst.itc.it/NuSMV/papers/sttt_j/html/paper.html. Another model checker may be Rulebase, commercially available from International Business Machines Inc. (IBM) of the USA, which includes in it a symbolic model checker. The article by C. Eisner, "Using Symbolic CTL Model Checking to Verify the Railway Stations of Hoorn-Kersenboogerd and Heerhugowaard", *Software Tools for Technology Transfer*, Vol. 4, number 1 pp. 107-124, includes a nice tutorial on the process of symbolic model checking.

One of the important functions of symbolic model checkers is to determine which group RS of states of a model may be reached from an initial group $S_0$ of states and which cannot be reached. This is known as "reachability". FIG. 2, to which reference is now briefly made, is an illustration of a state machine 12 with six states, A, B, C, D, E and F. Each state represents one particular set of assignments of three state variables ($v_1$, $v_2$, $v_3$) forming a state vector $\bar{v}$. Thus, for example, state A is the state with the values (0,0,0) while state C is the state with the values (1,0,1).

State machine 12 moves through the states as indicated by the arrows on FIG. 2. Thus, state machine 12 may remain at state A or it may proceed to state C and from there to state E or it may begin at state B and move to state D. This movement through the groups of state is defined, in symbolic model checking, by a "transition relation" R from one state vector $\bar{v}$ to a "next" state vector $\bar{v}'$. For state machine 12, transition relation R is:

$$R(\bar{v}, \bar{v}') = \begin{Bmatrix} (000,000) \\ (000,101) \\ (011,001) \\ (101,111) \\ (110,011) \end{Bmatrix}$$

From the initial group $S_0$ of states $\{A, B\}$, the state machine may get to the group $S_1$ of states $\{A,C,D\}$ in one step. State A has already been explored and thus, the next step is to explore states C and D. From the group $\{C,D\}$, the state machine can get to the group $S_2$ comprised of state E. Since state E has no outward going arrow, the model checker is finished. From these results, the reachable states are A,B,C and D. State F is not reachable from any of the initial states.

A model checker may operate on the graph of FIG. 1 and may follow the arrows, looking for states. A symbolic model checker may perform its checking through use of a symbolic representation of the graph, rather than the graph itself.

The model described above is a Kripke structure M defined over a set of atomic propositions AP. Mathematically, this is written:

$$M=(S,S_0,R,L)$$

where L is a labeling function that labels each state S with the set of atomic propositions that are true in that state S. The states of the Kzipke structure are coded by the group of state variables $\bar{v}$.

The basic operations in symbolic model checking may be the image computation and the pre-image computation. The image computation of $S_i$ uses transition relation R to move to the next group of states $S_{i+1}$. The pre-image computation of $S_i$ uses transition relation R to take a step backwards to the group of states $S_{i-1}$.

More precisely:

$$\text{image}(S(\bar{v}),R(\bar{v},\bar{v}'))=\exists\bar{v}(S(\bar{v}) \wedge R(\bar{v},\bar{v}'))$$

and $$\text{pre\_image }(S(\bar{v}'),R(\bar{v},\bar{v}'))=\exists v'(S(v') \wedge R(\bar{v},\bar{v}'))$$

where $S(\bar{v})$ and $R(\bar{v},\bar{v}')$ are BDDs representing a group of states S and a transition relation R, respectively, $\exists$ is the 'exist' function and $\wedge$ is the 'and' function. Computing $\exists xA(\bar{v})$ may be referred to as "quantifying x out of A". Early existential quantification may make image and pre-image computations more efficient by reducing the size of the BDD.

A "conjunctive partitioned transition relation" may be composed of a set of partitions and_$R_i$ such that, when they are 'anded' together, they produce the transition relation $R(\bar{v},\bar{v}')$, or, mathematically:

$$R(\bar{v},\bar{v}')= \wedge_i \text{and\_}R_i(\bar{v},\bar{v}'_i)$$

If each state variable $v_i$ can be described by a single conjunctive partition, then and_$R_i=(v'_i=f_{v_i}(\bar{v}))$ and thus, each partition may be a function of the current set of variables $\bar{v}$ and $v'_i$ (the ith next step variable) rather than the current and next step sets of variables, $\bar{v}$ and $\bar{v}'$, respectively. The image computation in this case is:

$$\text{image}(S(\bar{v})) = \exists \bar{v}\left(S(\bar{v}) \wedge \left(\bigwedge_{v_i} \text{and}\_R_{v_i}(\bar{v}, v'_i)\right)\right)$$

A "disjunctive partitioned transition relation" may be composed of a set of partitions or_$R_i$ such that, when they are "or'ed" together, they produce the transition relation $R(\bar{v},\bar{v}')$, or, mathematically:

$$R(\bar{v},\bar{v}') = \vee_i \text{or}\_R_i(\bar{v},\bar{v}')$$

If each current state variable $v_i$ can be changed only in a single disjunctive partition, then $$\text{or}\_R_{v_i} = (v'_i = f_{v_i}(\bar{v})) \wedge (\forall\, y \neq v_i : y = y').$$

The image computation in this case is:

$$\text{image}(S(\bar{v})) = \exists \bar{v}\left(S(\bar{v}) \wedge \left(\bigvee_{v_i} \text{or}\_R_{v_i}(\bar{v}, v'_i)\right)\right)$$

Because existential quantification distributes, mathematically, over disjunction, every quantification may be performed before performing the disjunction operation and thus:

$$\text{image}(S(\bar{v})) = \bigvee_{v_i} \exists \bar{v}(S(\bar{v}) \wedge \text{or}\_R_{v_i}(\bar{v}, v'_i))$$

Because quantification may be done before disjunction for every variable $v_i$ in the disjunctive partitioning, all intermediate BDD results depend only on the set of next step variables $\bar{v}'$, while when using conjunctive partitions, the intermediate BDD results may depend both on the current and next step sets of variables, $\bar{v}$ and $\bar{v}'$. Thus, using disjunctive partitions usually results in smaller intermediate BDDs than when using conjunctive partitions.

The following articles discussed the application of symbolic model checking to general purpose software by translating C source code to EDL (Environment Description Language), which may be the input language to the RuleBase model checker:

C. Eisner, "Model checking the garbage collection mechanism of SMV", In S. D. Stoller and W. Visser, editors, *Electronic Notes in Theoretical Computer Science*, volume 55, Elsevier Science Publishers, 2001; and C. Eisner and D. Peled, "Comparing symbolic and explicit model checking of a software system," In *Proceedings, 9th International SPIN Workshop on Model Checking of Software*, LNCS 2318, Springer-Verlag, 2002, pages 230-239.

BRIEF DESCRIPTION OF THE DRAWINGS

The subject matter regarded as the invention may be particularly pointed out and distinctly claimed in the concluding portion of the specification. The invention, however, both as to organization and method of operation, together with objects, features, and advantages thereof, may best be understood by reference to the following detailed description when read with the accompanying drawings in which:

FIG. 4A is an illustration of a fragment of an exemplary, simple C program;

FIG. 4B is an illustration of the translation of the program of FIG. 4A to an intermediate code, in accordance with a preferred embodiment of the present invention;

FIGS. 5A and 5B are illustrations of ODL and EDL models, respectively, for the exemplary intermediate code of FIG. 4B;

FIGS. 6A, 6B and 6C are illustrations of the translation to ODL of three exemplary assignment statements;

Figure 1:
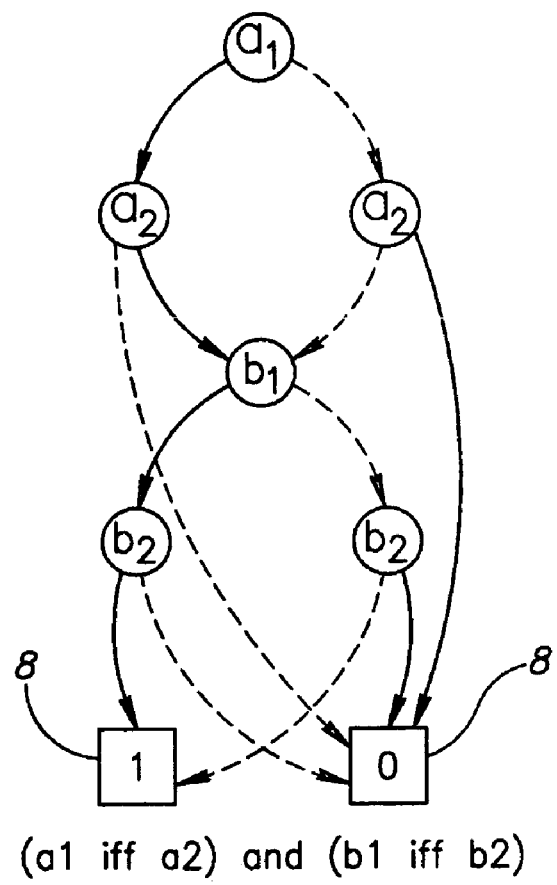
FIG. 1 is a schematic illustration of a prior art binary decision diagram (BDD)
Figure 2:
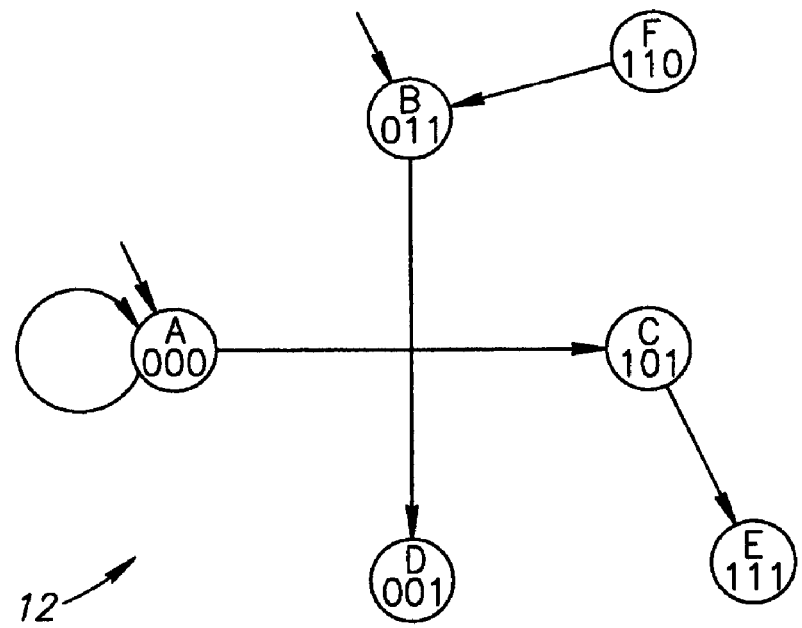
FIG. 2 is a schematic illustration of a state machine with six states.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE INVENTION

In the following detailed description, numerous specific details may be set forth in order to provide a thorough understanding of the invention. However, it will be understood by those skilled in the art that the present invention may be practiced without these specific details. In other instances, well-known methods, procedures, and components have not been described in detail so as not to obscure the present invention.

Applicants have realized that, in software, there may be little change in the program variables per step of the program. Thus, the present invention first may generate a model of a software program to be checked, where, in the program model, each step changes only a program counter (pc) indicating the current step in the program, and at most, one additional state variable x. With only two state variables changing, disjunctive partitions may be utilized and may be kept small. The present invention may thus be useful for software and for other methods and models where only a subset of the variables change their value at any given time.

In another embodiment, a new image and pre-image computation may be presented. In the traditional image computation algorithm, each disjunctive partition must represent the next value for all variables, so the disjunctive partition of state variable x should indicate the change of x and pc, and the fact that all the other variables keep their value. However, the fact that all the other variables keep their value increases the size of the BDD of the partition. The present invention may include new image and pre-image computations which operate on the partial disjunctive partition of x, which represents only the changes of x and pc, and not the fact that all other variables keep their value. The present invention decreases the BDD size needed to represent the disjunctive partitions, which may improve the image computation.

Figure 3A:
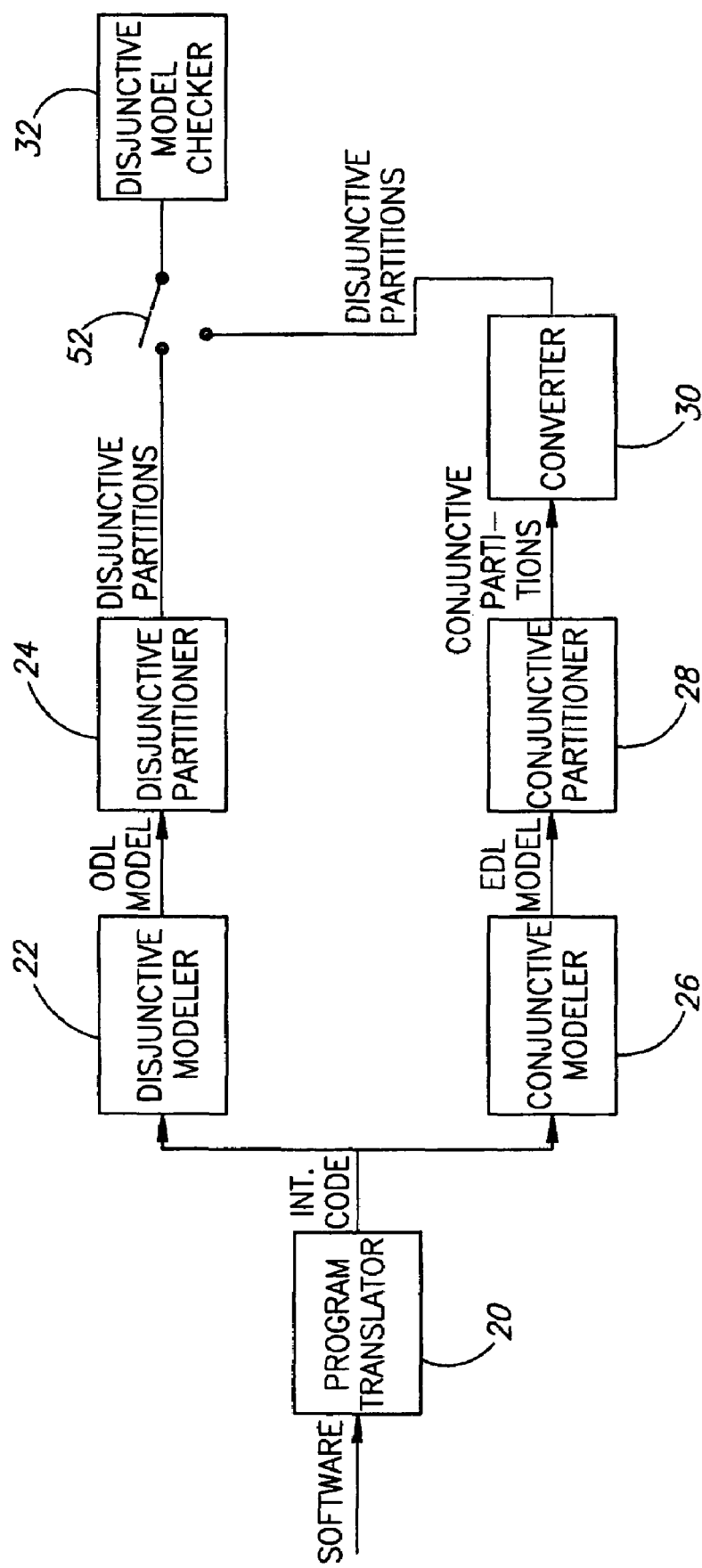
FIG. 3A is a block diagram illustration of a symbolic model checker, constructed and operative in accordance with the present invention.
Figure 3B:
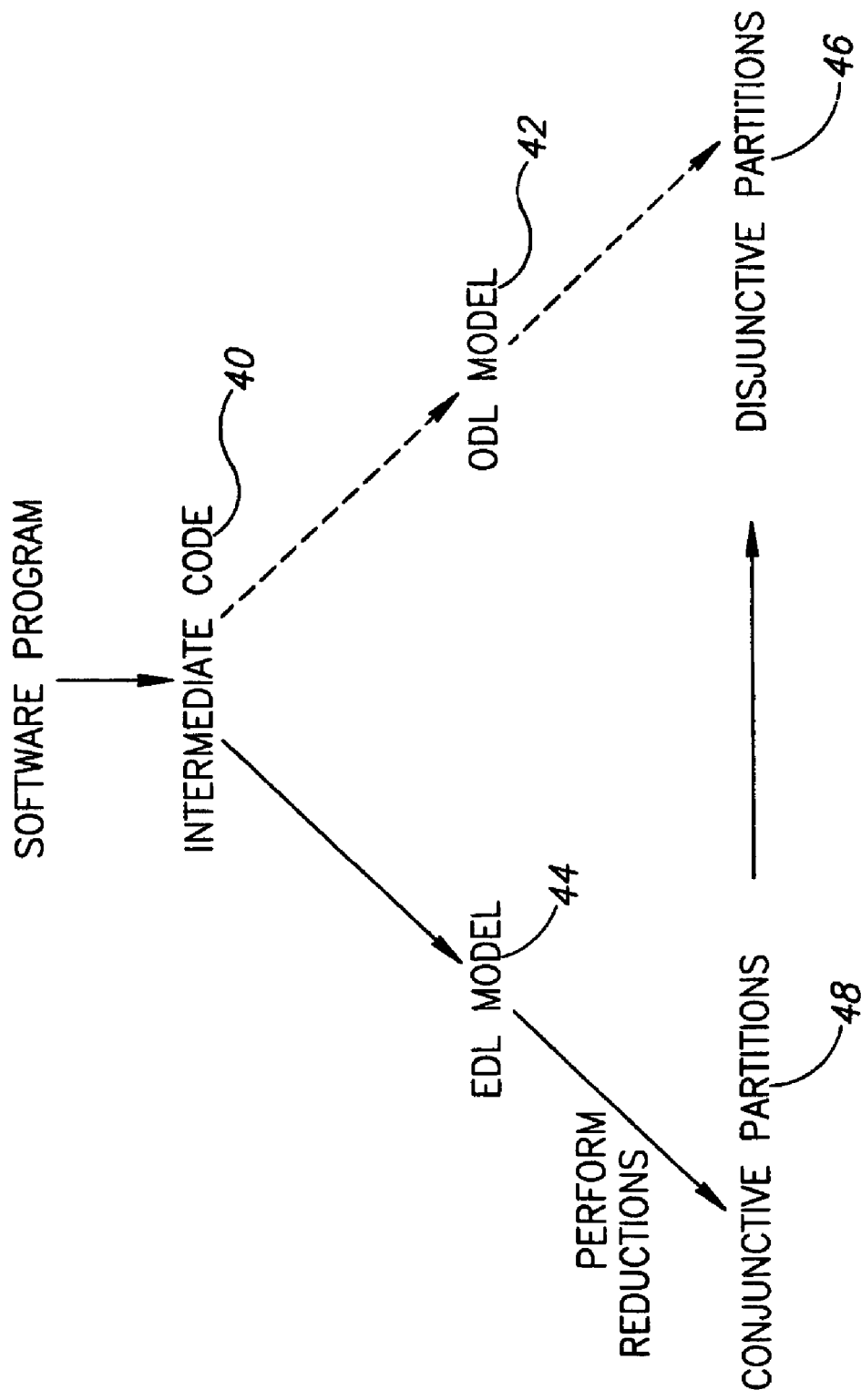
FIG. 3B is an illustration of the flow of data in the system of FIG. 3A.

Reference is now briefly made to FIG. 3A, which illustrates a model checking system, constructed and operative in accordance with the present invention, and to FIG. 3B, which illustrates the flow of data in the system of FIG. 3A.

The system of FIG. 3A may comprise a program translator 20, a disjunctive modeler 22, a disjunctive partitioner 24, a conjunctive modeler 26, a conjunctive partitioner 28, a converter 30 and a symbolic model checker 32. Program translator 20 may translate a software program into intermediate code 40 which may be provided to disjunctive modeler 22 and to conjunctive modeler 26, both of which produce models in which, at each step program counter pc and at most, one additional state variable x changes. Disjunctive modeler 22 may produce a disjunctive model 42, known as an ODL model, which may be described in more detail hereinbelow. Conjunctive modeler 28 may produce a conjunctive model 44, known as an EDL model, and may be part of the RuleBase model checking system, mentioned hereinabove in the Background of the Present Invention.

Conjunctive partitioner 28, another part of the RuleBase system, may produce conjunctive partitions from EDL model 44. Partitioner 28 may also perform BDD reductions, thereby to produce smaller partitions. Disjunctive partitioner 24, described in more detail hereinbelow, may produce disjunctive partitions from ODL model 42. Both models 42 and 44 may be provided to model checker 32. Model checker 32 may be any suitable symbolic model checker, such as RuleBase. Converter 30 may convert the reduced size conjunctive partitions produced by conjunctive partitioner 28 to reduced size disjunctive partitions 46, which, in turn, may be input into model checker 32.

Reference is now made to FIG. 4A, which illustrates a fragment of an exemplary, simple C program and to FIG. 4B, which illustrates its translation, by translator 20, to intermediate code 40, in accordance with a preferred embodiment of the present invention.

The code of FIG. 4A has two global variables, x and z. In the intermediate code of FIG. 4B, there is a list of instructions, each with a unique program counter pc, listed at the beginning of each line. Program counter pc may be updated to the pc of the next line if not specified otherwise.

The first two lines of FIG. 4B indicate the behavior for lines pc=18 and pc=19. This is the intermediate code generated for line 1 in the C code (z=0). At line pc=18, the value 0 may be inserted to variable r1, and variable r1 may be inserted into z in line pc=19. Lines like the one for pc=22, which do not have any code, may be used as jump targets and only update program counter pc to the program counter of the next line. The lines pc=24 through 27 perform the while condition: first in line pc=24, the variable x may be inserted into r2 and then, in line pc=26, it may be checked if it is bigger than 0. A true answer may set program counter pc to 29 (enter the loop), while a false answer may set it to the pc of the next line, which in turn may set program counter pc to 53, which may be after the loop.

Disjunctive modeler 22 may translate intermediate code 40 to ODL, a language that may have the style of a guarded transition system. In the present invention, each transition may be of the form:

$$pc=PC_1 \wedge P(x,Y,Z) \Rightarrow (x \leftarrow f(x,Y,Z) \wedge pc \leftarrow PC_2)$$

In the present invention, the guard may be a condition minimally about the value of program counter pc. The guard may also be a condition about the value of one additional state variable and may have a predicate P about other variables x,Y,Z. Note that this transition may change a different variable depending on the value of other state variables but only one state variable may change its value at any one time. For instance, an assignment of an array a of the form a[i]=5 may change a[0] (P=:i=0) or a[1], etc., depending on the value of i. But only one array location may change at any one time. For a[0]=5, predicate P is "i=0" while for a[1]=5, predicate P is "i=1".

Reference is now briefly made to FIGS. 5A and 5B, which illustrate ODL model 42 and EDL model 44 for the exemplary intermediate code of FIG. 4B. In both models 42 and 44, the #define operator may be utilized to store assignments of intermediate variables (i.e. variables other than the state variables in the original code of FIG. 4A) in registers, called "main_x". Thus, lines, such as pc=24, 35, 37, 39, 44 and 46, may be implemented with the #define operator.

For ODL model 42, each line in the intermediate code may be translated to a guarded expression representing the changes for this value of the program counter pc. For example in line pc=19, state variable z may receive main_r1 and pc may be set to 22. This is listed in ODL model 42 as: pc=19⇒(z←main_r∧pc←22). It will be appreciated that ODL model 42 may encode only those state variables that change their values, it being implicit that every non-listed state variable keeps its value.

In EDL model 44, the assignments of each state variable may be gathered together. Thus, in FIG. 5B, there may be sections "next(pc).", "next(x)" and "next(z)". For example, the code for next(z) may include assignments for the lines 19 and 41 of intermediate code 40 (FIG. 3B). In addition, EDL model 44 may include a line for each state variable $v_i$ at each step, even if the state variable does not change its value at each step.

FIG. 4A, whose intermediate code and ODL and EDL models are discussed hereinabove, is a fairly simple portion of software. Standard software may also include more complicated operators, such as pointers and arrays. In the present invention, program translator 20 may model such operators using cut-points. To do this, translator 20 may define four variables usable for each array. For example, for an array ar, translator 20 may utilize some of the variables l_index$_{ar}$, l_array$_{ar}$, r_index$_{ar}$ and r_array$_{ar}$, where the prefix l/r may indicate that the array is in the left or the right side of an assignment.

Three exemplary assignments are shown in FIGS. 6A, 6B and 6C, to which reference is now made. FIG. 6A may show an exemplary translation of an assignment x=ar[i] and FIG. 6B may show an exemplary translation of ar[i]=x. Both figures are believed to be self-explanatory; however, it is noted that both sets of assignments may use the array variables r_index and l_index to store the index i and r_array and l_array to store the values to be stored in the array at the next step.

It is further noted that, when using translator 20 on software containing assignments of the type: x=ar[i]; x=ar[j]; y=ar[i]; y=ar[j], translator 20 may produce intermediate code in which r_index$_{ar}$ may be dependent on i and j, r_array$_{ar}$ may be dependent on r_index$_{ar}$ and on the ar cells, and x and y may be dependent only on r array$_{ar}$. Without cut-points, x and y would be dependent on i and j and on all cells of array ar.

For assignments of the type x=a[i]+a[j], translator 20 may split such statements into two: temp=a[i]; x=temp+a[j].

For assignments such as a[a[i]]=5, translator 20 may produce intermediate code with two different accesses to the array, one to get a[i] and the second to assign it to a[a[i]]. This may be seen in FIG. 6C.

Translator 20 may perform similar operations for pointers. For pointers, translator 20 may have four additional variables, L_PTR, R_PTR, L_VALUE and R_VALUE, where, as for arrays, the prefix L/R means that the pointer is in the left/right side of the assignment.

Translator 20 may translate an assignment x=*p into the following three assignments, having consecutive program counters pc:

```
R_PTR=p

R_VALUE=*R_PTR x=R_VALUE
```

Translator 20 may translate an assignment *p=x into the following three assignments:

```
L_PTR=p

L_VALUE=x

*L_PTR=L_VALUE
```

When using this translation on C++ code containing the following assignments:

```
x=*p;

x=*q;

y=*P;

y=*q;
``` translator 20 may produce code in which R_PTR is dependent on p and q, R_VALUE is dependent on R_PTR and all pointed memory locations, and x and y are dependent only on R_VALUE. Without cut-points, x and y would be dependent on p, q and all pointed memory locations.

Translator 20 may translate self-assignment statements in which the value assigned to a variable, such as x, is a function of that variable (e.g., in C++ notation, x+=y or x=x+w+z). There are two types: constant self-assignment statements, where the variable may be updated by a constant (e.g., x+=4, x++), and variable self-assignment statements (e.g. x+=y, x=x iff b+c). Translator 20 may divide variable self-assignment statements into two statements: thus, for like x+=y, translator 20 may produce: temp=x, x=temp+y. This split may increase the number of program counter pc values and adds the variable temp (used for all such splits) but may improve overall performance.

Figure 7:
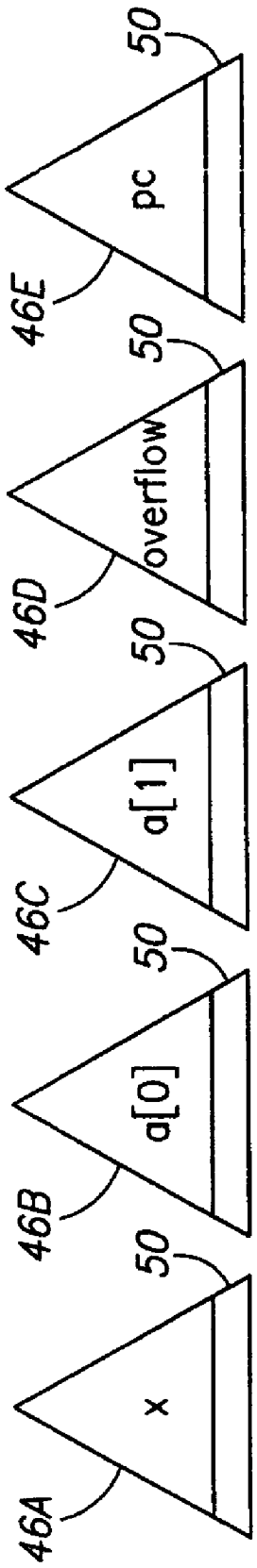
FIG. 7 is a schematic illustration of an exemplary set of disjunctive partitions.

From ODL model 42, disjunctive partitioner 24 may produce disjunctive partitions 46. Since, in each line of ODL model 42, the program counter pc changes and at most one other variable changes, disjunctive partitioner 24 may build disjunctive partitions 46 with a partition for each variable. This may generate a reasonable number of partitions, each of a reasonable size. Reference is now made to FIG. 7, which illustrates an exemplary set of disjunctive partitions 46 and the following code:

```
22: x=x+1

25: a[i]=x

28: if x>2 goto 25
``` where the intervening steps (23, 24, 26, 27) are not related to variable x.

Partition 46A may encode the code for variable x. Thus, for the example it may include a BDD for the following code: if pc=22→x'=x+1, pc'=23, where the symbol "=" indicates "exactly equals" and the variable v' is the next value of variable v.

The BDD of partition 46B may encode the code for variable a[0], the BDD of partition 46C may encode the code for variable a[1], the BDD of partition 46D may encode the code for a special state variable overflow, and the BDD of partition 46E may be the partition for variable pc. It may be noted that partition 46E may encode those lines of code which change program counter pc only. It may be further noted that state variable overflow may be included to deal with overflows of arrays. The program developer does not intend to have any overflows; however, overflows do occasionally occur. By including an overflow variable, the model may be more complete.

In FIG. 7, disjunctive partitions 46 are shown as triangles whose lower areas, labeled 50, are shaded. Lower areas 50 may store a listing of the state variables, denoted by $\bar{y}$, which do not change at a given program line, as required by the rules of disjunctive partitioning. This may be noted by $\bar{y}=\bar{y}'$. The non-shaded area of each triangle may indicate the portion of the partition referring to the variable of interest.

Disjunctive partitioner 24 (FIG. 3A) may be any suitable partitioner which may generate BDDs (binary decision diagrams) from ODL model 42.

It will be appreciated that ODL model 42 may be considered a language for describing disjunctive BDDs, since each line of ODL model 42 describes the value in the next state x' of a variable x as a Boolean expression. Thus, disjunctive partitioner 24 may translate each line of ODL model 42 as a BDD, such as discussed hereinabove in the Background, and each per line BDD may be treated as a disjunctive partition.

In order to get a reasonable number of disjunctive partitions, partitioner 24 may disjunct all partitions which change a certain variable x, producing a single disjunctive partition for each variable x. In addition, partitioner 24 may disjunct all per line partitions which change only program counter pc, producing a single disjunctive partition for pc control.

Conjunctive partitioner 28 may be any suitable partitioner which may generate BDDs from EDL model 44. Code for one suitable conjunctive partitioner is found in the article by C. Eisner, "Using Symbolic CTL Model Checking to Verify the Railway Stations of Hoorn-Kersenboogerd and Heerhugowaard", mentioned hereinabove. RuleBase may provide another suitable partitioner.

Converter 30 may convert conjunctive partitions 48 (FIG. 3B) produced by conjunctive partitioner 28 to disjunctive partitions 46 and vice versa. This may be shown schematically in FIG. 8, to which reference is now briefly made.

Figure 8:
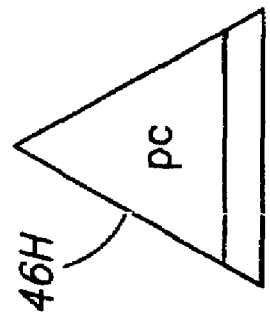
FIG. 8 is a schematic illustration of a plurality of conjunctive partitions for variable x and program counter pc and a corresponding plurality of disjunctive partitions.
Figure 8:
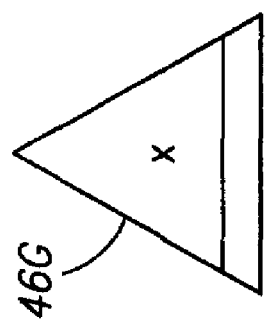
Figure 8:
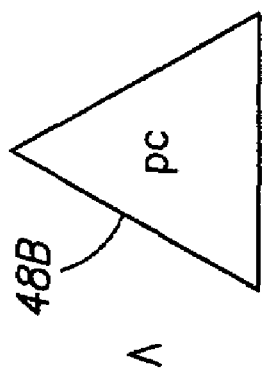
Figure 8:
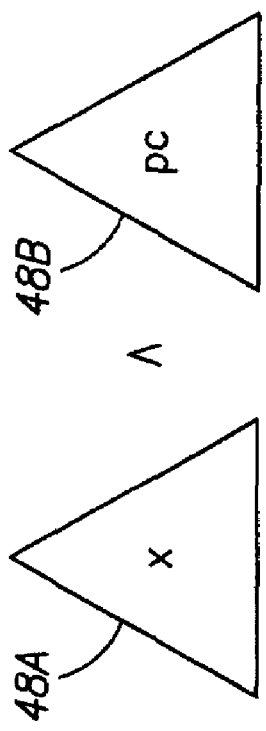

FIG. 8 shows conjunctive partitions 48A and 48B for variable x and program counter pc and disjunctive partitions 46G and 46H for variable x and program counter pc for the exemplary partial code in FIG. 7.

As can be seen, conjunctive partition 48A for variable x lists the state of next variable x' for each value of program counter pc and conjunctive partition 48B for program counter pc lists the next value of the program counter. For example, one line says: if pc=22, then pc'=23.

Disjunctive partition 46G for variable x looks different than conjunctive partition 48A for variable x. Disjunctive partition 46G lists the state of all variables for each program counter value. Thus, it lists, in part, if pc=22, then x'=x+1, pc'=23, y'=y.

For converter 30, the disjunctive partitions 46 of a state variable x may be an array or_$R_x(\bar{v},\bar{v}')$ and the conjunctive partitions 48 of state variable x may be an array and_$R_x(\bar{v},x')$. Converter 30 may operate on disjunctive partitions where each dereference, such as arrays and pointers, may be broken by a cut-point, as described in detail hereinabove.

Converter 30 may define a variable dep_states$_x(\bar{v})$ storing generally all of the states related to lines in the input software program where x is assigned a value, except for the case where x is assigned the same value it had before the assignment. Converter 30 may also define a variable dep_pcs$_x$(pc) which may store the set of pc values which are related to statements in which the variable x may change. Finally, converter 30 may define a partial disjunctive partition of a state variable x, denoted by por_$R_x(pc,x,\bar{y},x',pc')$, which may be the disjunctive partition or_$R_x(\bar{v},\bar{v}')$ without the requirement that the state variables $\bar{y}$ which are different from pc and x be left unchanged. In other words, partial disjunctive partitions do not have lower shaded areas 50 of FIG. 7.

Converter 30 may build a disjunctive partition for state variable x from the conjunctive partition for that state variable and the conjunctive partition for the program counter pc. For the state variables which are not program counter pc, the translation is:

1. Calculate dep_states$_x(\bar{v})$ $$\text{dep\_states}_x(\bar{v}) = \exists x'(\text{and\_}R_x(\bar{v},x') \wedge x \neq x')$$

2. Intersect the quantification of x from dep_states$_x(\bar{v})$ with the conjunctive partitions and_$R_x(\bar{v}, x')$ and and_$R_x((\bar{v}, pc'))$ of x and pc, respectively, to generate the partial disjunctive partition por_$_{Rx}(pc,x,\bar{y},x',pc')$:

$$\text{por\_}R_x(Pc,x,\bar{y},x',pc') = (\exists x(\text{dep\_states}_x(\bar{v}))) \wedge \text{and\_}R_x(\bar{v},x') \wedge \text{and\_}R_{pc}(\bar{v},pc')$$

It is noted that the disjunctive partition or_$R_x(\bar{v},\bar{v}')$ for variable x may be generated by intersecting partial disjunctive partition por_$R_x(pc,x,\bar{y},x',pc')$ with $\bar{y}=\bar{y}'$, where the latter indicates that the other variables do not change:

$$\text{or\_}R_x(\bar{v},\bar{v}') = \text{por\_}R_x(pc,x,\bar{y},x',pc') \wedge (\bar{y}=\bar{y}')$$

The following describes how converter 30 may build a disjunctive partition for the program counter PC:

1. Calculate dep_pcs$_x$(pc) for each $x \neq pc$:

$$\text{dep\_pcs}_x(pc) = \text{dep\_states}_x(\bar{v})|_{pc}$$

where $A|_{\bar{x}}$ indicates the projection of the set A onto a set of variables $\bar{x}$.

2. Calculate the set of pc values jump_pcs(pc) that are related to statements in which PC is the only state variable that is changed. These pc values are related to statements in which there is a control branch, like an if statement:

$$\text{jump\_pcs}(pc) = \wedge_{x=pc}(\overline{\text{dep\_pcs}_x(pc)})$$

3. Intersect conjunctive partition and_$R_{pc}(\bar{v},pc')$ with the set jump_pcs(pc) to get the value of pc' for the current pc value in a partial disjunctive partition por_$R_{pc}(pc,x,\bar{y},pc')$:

$$\text{por\_}R_{pc}(pc,x,\bar{y},pc') = \text{jump\_pcs}(pc) \wedge \text{and\_}R_{pc}(\bar{v},pc')$$

Once again, the disjunctive partition or_$R_{pc}(\bar{v},\bar{v}')$ for program counter pc may be generated by intersecting partial disjunctive partition por_$R_{pc}(pc,x,\bar{y},pc')$ with $\bar{y}=\bar{y}'$, where, in this case, $\bar{y}$ may be all variables that are different from pc:

$$\text{or\_}R_{pc}(\bar{v},\bar{v}') = \text{por\_}R_{pc}(pc,x,\bar{y},pc') \wedge (\bar{y}=\bar{y}')$$

Model checker 32 (FIG. 3A) may operate on conjunctive partitions 48, as in the prior art, or on disjunctive partitions 46. This is indicated in FIG. 3A with a switch 52. In accordance with a preferred embodiment of the present invention, for operating on disjunctive partitions 46, Applicants have realized that it may be sufficient to perform model checking on the partial disjunctive partitions rather than the disjunctive partitions, since the partial disjunctive partitions may store the information about the variables which transition at a given program line. The additional information in the disjunctive partitions, that of $\bar{y}=\bar{y}'$, may not be necessary for the model checking operation. The above statement may be stated mathematically as follows:

$$\text{pre\_image}(S(pc',x',\bar{y}'), \text{or\_}R_x(pc,x,\bar{y},pc',x',\bar{y}')) = \text{pre\_image}(S(pc',x',\bar{y}'), \text{por\_}_{Rx}(pc,x,\bar{y},pc',x'))$$

$$\text{image}(S(pc,x,\bar{y}), \text{or\_}R_x(pc,x,\bar{y},pc',x',\bar{y}')) = \text{image}(S(pc,x,\bar{y}'), \text{por\_}R_x(pc,x,\bar{y},pc',x'))$$

Thus, model checker 32 may perform the following code using the partial disjunctive partitions:

```
new_pre_image(S(v̄'), por_R_x (v̄, x', pc'))
{
    Tmp_S = ∃ȳ'(S(v̄') ∧(ȳ = ȳ'))
    return pre_image(Tmp_S, por_R_x (v̄, x', pc'))
}
``` where "pre_image" may be a function implementing the pre_image computation of the prior art.

```
new_image(S(v̄'), por_R_x (v̄, x', pc'))
{
    Tmp_S = ∃ȳ(S(v̄) ∧(ȳ = ȳ'))
    Tmp_R_x = ∃ȳ(por_R_x (v̄, x', pc') ∧(ȳ = ȳ'))
    return image(Tmp_S, Tmp_R_x)
}
``` where "image" may be a function implementing the image computation of the prior art.

It will be appreciated that the exist operation may be implemented in many different ways, including ones which are linear in the size of the BDD.

When performing the image or pre-image computations using disjunctive partitions, it may be possible to calculate the image or pre-image on each disjunctive partition independently and then union the results. In accordance with a preferred embodiment of the present invention, the calculations may be performed on distributed processors.

Figure 9A:
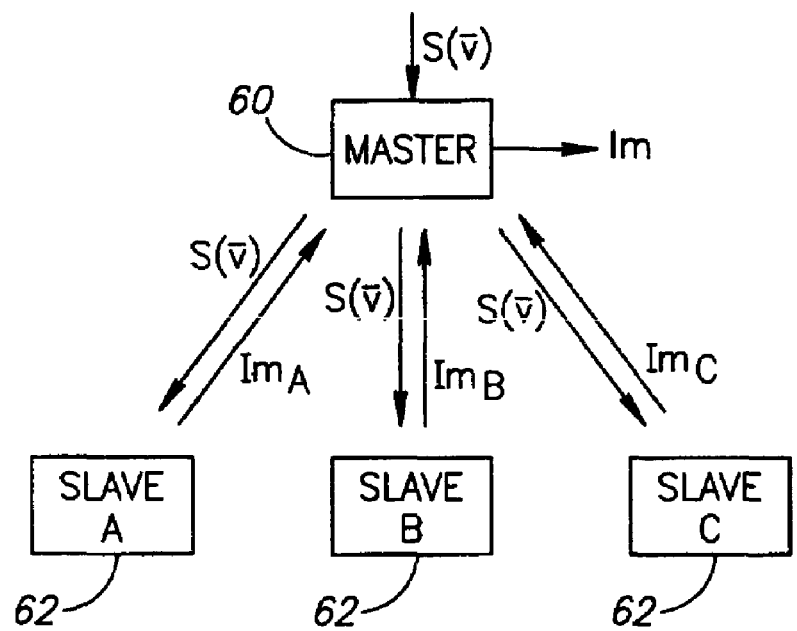
FIGS. 9A and 9B are schematic illustrations of two alternative distributed systems for symbolic model checking, constructed and operative in accordance with the present invention.
Figure 9B:
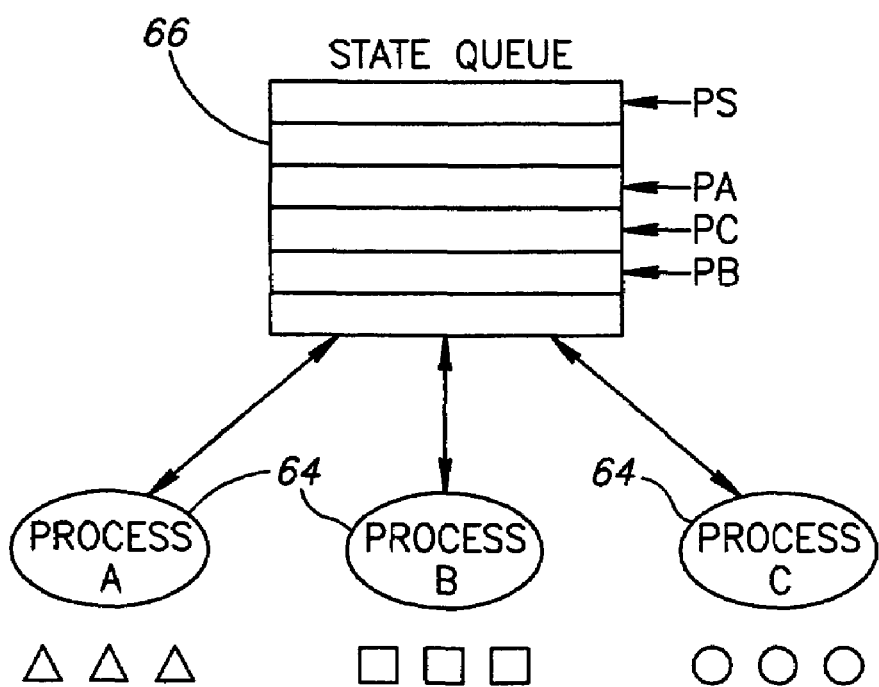

Reference is now made to FIGS. 9A and 9B, which illustrate two alternative systems for performing the image and/or pre-image computations with distributed processors. In FIG. 9A, there may be a master processor 60 and multiple slave processors 62. Master processor 60 may send $S(\bar{v})$ to slave processors 62 and may send each idle slave processor 62 a disjunctive partition. Each slave processor 62 that may receive a disjunctive partition may perform the image (or pre-image) computation with this partition and may union the result with previous results that the slave processor 62 made, producing a result Im$_i$. When there are no more partitions and slave processors 62 are idle, master processor 60 may gather results Im$_i$ and may union them, producing the image result Im for the current state. The process is repeated until no new states are seen.

In FIG. 9B, there may be multiple processes 64 and a shared queue 66 of sets of states. Each process P$_i$ may have its own reachability set RS$_i$ and may be responsible for several partitions TR$_i$ (in FIG. 9B, process A is responsible for the partitions denoted by triangles, process B is responsible for the partitions denoted by squares and process C is responsible for the partitions denoted by circles). Each process may also have two pointers to queue 66: a shared pointer PS for entering sets to the queue and a private one (PA, PB or PC, respectively) for reading from queue 66.

In this embodiment, processes A, B and C may read each set that may enter queue 66. At the beginning, queue 66 may have the initial set of states. Each process Pi, at each iteration, may perform the following actions:

1. take the set S from queue 66 according to its private pointer PA, PB, PC;
2. remove from set S those parts that the process may already have handled $S=S \setminus RS_i$;
3. add the result to $RS_i$; and
4. calculate $image_i = image(S, TR_i)$.
5. in order to continue only with new states, remove any reachable states from $image_i$, producing $new_i = image_i \setminus RS_i$
6. If $new_i \neq 0$, place $new_i$ in the next entry of queue 66.

The calculation may end when all processes $P_i$ point to an empty slot in queue 66.

In accordance with an additional preferred embodiment of the present invention, the partial disjunctive partition for program counter pc need not always be generated. Instead, a new version of the image and pre-image calculations, called tango_image and tango_pre_image, respectively, may be performed. The tango_image and tango_pre_image operators may hold when the model of the present invention has the following properties:

1. Each program counter pc value is related only to one statement, either an assignment statement (i.e. changes a program variable) or a control statement (changes only program counter pc).
2. The transitions to a line of the code (i.e. to a program counter pc) come from either assignment statements or control statements but not both.
3. The transition relation of the model is total.

It is noted that the above three conditions do not always hold. For example, in the intermediate code of FIG. 4B, lines pc=50: pc←22 and pc=19: z←r1 both transition to pc=22 and thus, condition 2 does not hold. However, the intermediate code of FIG. 4B may be amended to ensure that condition 2 does hold by changing line pc=50 to transition to line pc=24. Thus, most models, if they do not fit the above three conditions, may be changed in minor ways to ensure that they do fit the conditions.

Figure 10A:
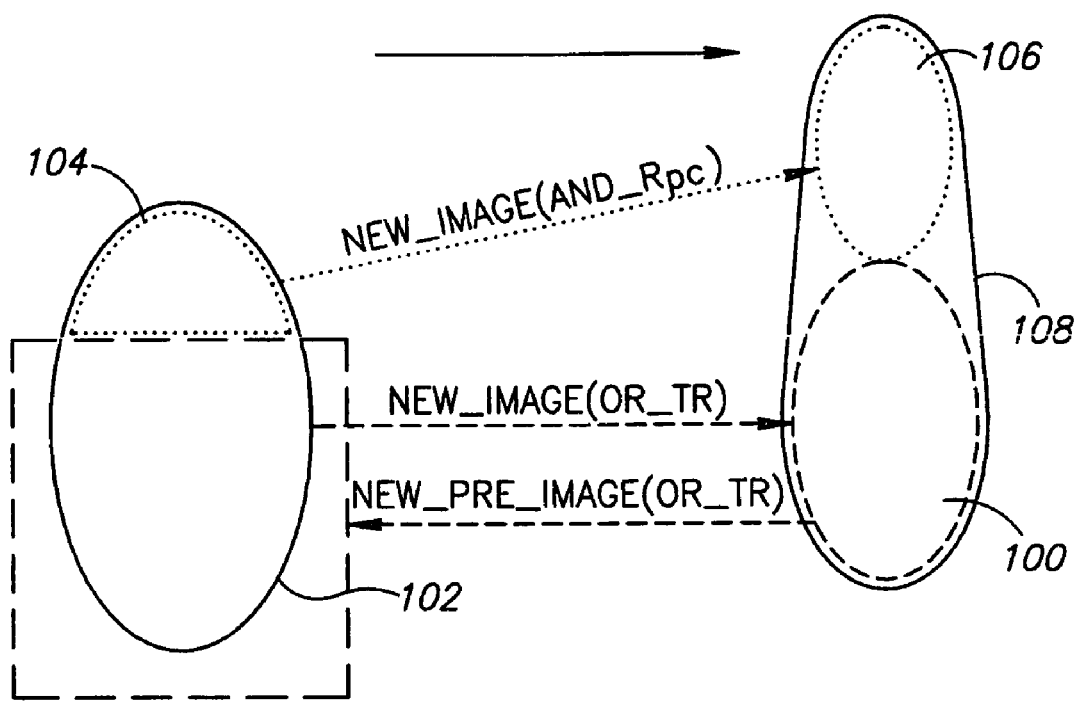
FIGS. 10A and 10B are schematic illustrations of the operations of operators tango_image and tango_pre_image, respectively, in accordance with a preferred embodiment of the present invention.
Figure 10B:
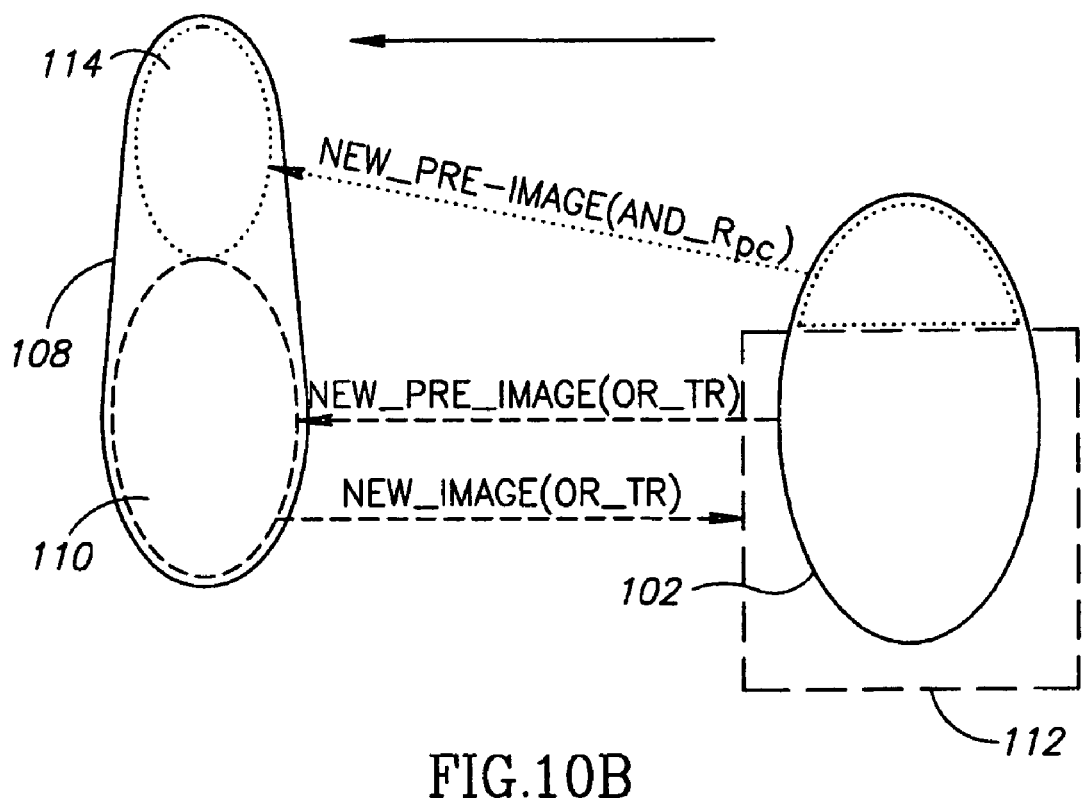

Reference is now made to FIGS. 10A and 10B, which illustrate the operations of the operators tango_image and tango_pre_image, respectively. The operator tango_image may first find a partial image 100 of a current set 102 of states using a disjunctive partitioned, transition relation, or_TR, where the latter may be the set of disjunctive partitions of all variables except program counter pc, as follows:

$$or\_TR = \{por\_R_x(\bar{v}, pc', x') | x \neq pc\}$$

Disjunctive partitioned, transition relation or_TR may be a reduced model, as it may refer only to the activities of the non-program-counter variables. Thus, the following two types of transitions are missing from relation or_TR, and thus, are not present in partial image 100:

1. Transitions which are related to control statements.
2. Transitions which are related to an assignment statement which does not change any variable. For example, invoking the assignment statement:

pc=7: x=x when pc=7. In both cases, all the transitions from the states in the domain of the missing transitions change only the value of program counter pc.

According to property 3 above, the transition relation of the full model is total. However, in the reduced model, partitioned transition relation or_TR does not contain all of the transitions of the full model. Thus, there may be "sink states" 104 (i.e. states which other states transition to but no states transition from) in current set 102 of states which have not transitioned to partial image 100. Moreover, since partitioned transition relation or_TR may only contain transitions of the non-program-counter variables, sink states 104 of current set 102 may change only program counter pc.

Operator tango_image may find sink states 104 by performing a new pre image operation on partial image 100 and then may generate a second partial image 106 of the missing transitions by doing a new_image computation using $and\_R_{pc}$ on sink states 104 to determine any changes in the value of program counter pc. Afterwards, the two partial images 100 and 106 may be joined (i.e. via a union operation) to generate a new current group of states 108.

tango_image($S(\bar{v})$, or_TR, and_$R_{pc}(\bar{v},pc')$):

1. Calculate image__100($\bar{v}$)=

$\vee_{x=pc}(new\_image(S(\bar{v}), por\_R_x(\bar{v},pc',x'), \bar{v}\setminus\{x,pc\}))$ 2. Calculate sink_states($\bar{v}$)=

$S(\bar{v}) \setminus \vee_{x=pc}(new\_pre\_image(image\_\_100(\bar{v}), por\_R_x(\bar{v},pc',x'), \bar{v}\setminus\{x,pc\}))$ 3. Return:

new_image(sink_states($\bar{v}$), and_$R_{pc}(\bar{v},pc')$,
   $\bar{v}\setminus pc$)$\cup$image__100($\bar{v}$)

FIG. 10B illustrates the operations for operator tango_pre_image, which may be performed only on states known to be reachable. These operations can be viewed as the "mirror image" of the tango_image operations. Thus, operator tango_pre_image may first produce a partial image 110 by performing a new_pre_image on the disjunctive partitioned, transition relation or_TR.

According to the properties above, the transitions which enter a single reachable state in current set 102 of states are either all missing or all present in or_TR. Since at least one transition enters each reachable state in current set 102, if a reachable state in current set 102 has no predecessors in partial image 110, then there may be transitions which enter this state in current set 102 and these transitions may change only the program counter pc. Operator tango_pre_image may find the states 112 without predecessors in partial image 110, by doing a new_image computation on or_TR, and may add the missing transitions 114 by doing a new_pre_image computation using the conjunctive operator and_$R_{pc}$ to know the previous program counter pc values.

tango_pre_image($S(\bar{v})$, or_TR, and_$R_{pc}(\bar{v},pc')$):

1. Calculate pre_image__110($\bar{v}$)=

$\vee_{x=pc}(new\_pre\_image(S(\bar{v}), por\_R_x(\bar{v},pc',x'),$
   $\bar{v}\setminus\{x,pc\}))$ 2. Calculate states_without_predecessors($\bar{v}$)=

$S(\bar{v}) \setminus \vee_{x=pc}(new\_image(pre\_image\_\_110(\bar{v}), por\_R_x(\bar{v},pc',x'), \bar{v}\setminus\{x,pc\}))$ 3. Return:

new_pre_image(states_without_predecess($\bar{v}$), and_$R_{pc}(\bar{v},pc')$,
   $\bar{v}\setminus pc$)$\cup$pre_image__110($\bar{v}$)

It will be appreciated that the tango operations may be performed on disjunctive partitions instead of the partial disjunctive partitions. To do so, the equations in paragraphs (152 160) and in paragraphs (153, 159) may be calculated using the image and pre-image operators, respectively, rather than the new_image and new_pre_image operators.

While certain features of the invention have been illustrated and described herein, many modifications, substitutions, changes, and equivalents will now occur to those of ordinary skill in the art. It is, therefore, to be understood that the appended claims may be intended to cover all such modifications and changes as fall within the true spirit of the invention.

What is claimed is:

1. A method comprising:
   generating a model of a software program in which, at each cycle of the model, a program counter and at most one non-program-counter variable change value; and
   symbolic model checking of said model using disjunctive partitioning at least for each said variable.

2. The method according to claim 1 and also comprising generating at least one disjunctive partition for each variable of said model.

3. The method according to claim 1 and also comprising generating at least one partial disjunctive partition for each variable of said model.

4. The method according to claim 1 and also comprising generating at least one conjunctive partition for each variable of said model and converting said conjunctive partitions to disjunctive partitions.

5. The method according to claim 1 and also comprising generating at least one conjunctive partition for each variable of said model and converting said conjunctive partitions to partial disjunctive partitions.

6. The method according to claim 3 and also comprising computing an image using said partial disjunctive partitions.

7. The method according to claim 3 and also comprising computing a pre-image using said partial disjunctive partitions.

8. The method according to claim 7 and also comprising computing a pre-image without generating a partial disjunctive partition for a program counter.

9. The method according to claim 6 and also comprising computing an image without generating a partial disjunctive partition for a program counter.

10. The method according to claim 2 and also comprising computing a pre-image from said disjunctive partitions without generating a disjunctive partition for a program counter.

11. The method according to claim 2 and also comprising computing an image from said disjunctive partitions without generating a disjunctive partition for a program counter.

12. The method according to claim 2 and also comprising computing reachability from said disjunctive partitions.

13. The method according to claim 3 and also comprising computing reachability from said partial disjunctive partitions.

14. The method according to claim 1 and also comprising checking said model for reachability.

15. The method according to claim 2 and also comprising computing an image using said disjunctive partitions.

16. The method according to claim 2 and also comprising computing a pre-image using said disjunctive partitions.

17. The method according to claim 6 and wherein said computing comprises in parallel computing a separate image for each said disjunctive partition and combining said separate images to generate said image.

18. The method according to claim 6 and wherein said computing comprises having multiple processors to determine reachability, each processor having a separate set of disjunctive partitions and a pointer to a location within a queue of sets of states and each generating an image from a set of states pointed to by said location and from its separate set of disjunctive partitions.

* * * * *